United States Patent
Hatahori et al.

(10) Patent No.: US 11,391,700 B2
(45) Date of Patent: Jul. 19, 2022

(54) DEFECT DETECTION DEVICE

(71) Applicant: Shimadzu Corporation, Kyoto (JP)

(72) Inventors: Takahide Hatahori, Kyoto (JP); Yuya Nagata, Kyoto (JP); Kenji Takubo, Kyoto (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/255,975

(22) PCT Filed: May 21, 2019

(86) PCT No.: PCT/JP2019/020086
§ 371 (c)(1),
(2) Date: Dec. 23, 2020

(87) PCT Pub. No.: WO2020/008745
PCT Pub. Date: Jan. 9, 2020

(65) Prior Publication Data
US 2021/0270777 A1    Sep. 2, 2021

(30) Foreign Application Priority Data
Jul. 4, 2018 (JP) .............................. JP2018-127257

(51) Int. Cl.
*G01N 29/04* (2006.01)
*G01B 11/16* (2006.01)
(Continued)

(52) U.S. Cl.
CPC ......... *G01N 29/041* (2013.01); *G01B 11/162* (2013.01); *G01N 21/8806* (2013.01);
(Continued)

(58) Field of Classification Search
CPC ............. G01N 29/041; G01N 29/2437; G01N 29/4445; G01N 29/2418; G01N 29/045;
(Continued)

(56) References Cited

U.S. PATENT DOCUMENTS

| | | | | |
|---|---|---|---|---|
| 4,101,795 A | * | 7/1978 | Fukumoto | B06B 1/0622 310/336 |
| 8,701,494 B1 | * | 4/2014 | Saxena | G01N 29/343 73/632 |

(Continued)

FOREIGN PATENT DOCUMENTS

| | | |
|---|---|---|
| JP | 2000-065802 A | 3/2000 |
| JP | 3955513 A | 5/2007 |

(Continued)

OTHER PUBLICATIONS

Nakajima, "Vibration Analysis by Holography", vol. 41, No. 6, Apr. 25, 1972, submitted with a machine translation.
(Continued)

*Primary Examiner* — Suman K Nath
(74) *Attorney, Agent, or Firm* — Muir Patent Law, PLLC

(57) ABSTRACT

[PROBLEM] To provide a defect detection device capable of detecting not only a defect within a visible range but also a defect outside the visible range among the objects to be inspected. [SOLUTION] A defect detection device 10 includes: an excitation source 11 capable of being placed at any position on a surface of an inspection target object S, the excitation source 11 being configured to excite an elastic wave within the inspection target object S, the elastic wave being predominant in one vibration mode and propagating in a predetermined direction; an illumination unit (pulsed laser light source 13, illumination light lens 14) configured to perform stroboscopic illumination on an illumination area of the surface of the inspection target object by using a laser light source; a displacement measurement unit (speckle (Continued)

shearing interferometer 15) configured to collectively measure a displacement of each point in a front-back direction within the illumination area in at least three different phases of the elastic wave, by speckle interferometry or speckle shearing interferometry; and a reflected wave/scattered wave detector 16 configured to detect either one or both of a reflected wave and a scattered wave of the elastic wave, based on the displacement measured by the displacement measurement unit.

6 Claims, 6 Drawing Sheets

(51) Int. Cl.
  *G01N 21/88* (2006.01)
  *G01N 29/24* (2006.01)
  *G01N 29/44* (2006.01)
(52) U.S. Cl.
  CPC ..... *G01N 29/2437* (2013.01); *G01N 29/4445* (2013.01); *G01N 2021/8838* (2013.01); *G01N 2291/0422* (2013.01)
(58) Field of Classification Search
  CPC ..... G01N 2291/012; G01N 2291/0427; G01N 2291/0422; G01N 2021/8838; G01N 21/8806; G01B 11/162; G01B 9/02095; G01B 9/02097; G01J 9/0215
  See application file for complete search history.

(56) References Cited

U.S. PATENT DOCUMENTS

| | | | |
|---|---|---|---|
| 2016/0043008 A1* | 2/2016 | Murray | H01L 22/12 438/5 |
| 2017/0350690 A1 | 12/2017 | Hatahori et al. | |
| 2019/0204275 A1 | 7/2019 | Hatahori et al. | |

FOREIGN PATENT DOCUMENTS

| | | |
|---|---|---|
| JP | 2017-219318 A | 12/2017 |
| WO | 2017/221324 A1 | 12/2017 |

OTHER PUBLICATIONS

Onoue et al., "Ultrasound traveling through the plate", 1966, submitted with a machine translation.
Written Opinion of the International Searching Authority (ISA237) for PCT application No. PCT/JP2019/020086, dated Aug. 20, 2019, submitted with a machine translation.
Extended European Search Report dated Jul. 9, 2021 for the corresponding European Patent Application No. 19830852.0.

* cited by examiner $$\lambda = \frac{\lambda_0}{\sin \theta}$$

DEFECT DETECTION DEVICE

TECHNICAL FIELD

The present invention relates to a defect detection device for detecting a defect of an object, such as, e.g., a concrete structure and a steel structure.

BACKGROUND ART

A laser ultrasonic method is one of the techniques to detect a defect on a surface and/or an inside of an object, such as, e.g., a concrete structure and a steel structure. In this method, the vibration of elastic waves is excited to an inspection target object. In this state, laser light is emitted to the inspection target object. The reflected light is detected by a laser interferometer to measure the surface displacement. Since the surface displacement caused by vibration changes discontinuously at the defect point, the defect can be detected by measuring the distribution of the surface displacement. However, in this method, since the detection laser (probe laser) of the laser interferometer is in a dot-shape, it is necessary to scan over the entire inspection area of the inspection target object, causing a problem that it takes time.

As an improved technique, a defect detection method using speckle interferometry or speckle shearing interferometry has been proposed. In the speckle interferometry, laser light from a laser light source is branched into illumination light and reference light, and stroboscopic illumination to the inspection area is performed using the illumination light. Then, the interference pattern by the light which is the illumination light reflected at each point on the surface of the inspection target object within the inspection area and the reference light is obtained. In the speckle shearing interferometer, stroboscopic illumination to the inspection area is performed using laser light from a laser light source (reference light is not branched) to obtain the interference pattern due to the light reflected from two points close to each other on the surface of the inspection target object in the inspection area. In these defect detection methods, an elastic wave is applied to the inspection target object, and the images of the interference patterns are captured with a CCD-camera before and after the application of the elastic wave. Thus, the distribution of the displacement in the front-back direction or the relative displacement of the inspection area in the front-back direction (in the out-of-plane direction) calculated from the two images, respectively. Since the displacement or the relative displacement at the location of the defect becomes discontinuous, it is possible to detect the defect present in the inspection area. In these methods, however, only one state of the elastic wave can be seen. Therefore, in cases where the wavelength of the elastic wave is smaller than the inspection area, the detection can be easily performed if the defect happens to be present at a portion where the amplitude of the wave is large, but the detection is difficult if the amplitude of the defect is present at a portion where the amplitude of the wave is small. That is, the defect inspection capability differs depending on the location in the inspection area.

On the other hand, Patent Document 1 discloses that, in a defect detection method using speckle interferometry or speckle shearing interferometry, the displacement of each point (speckle interferometry) or the relative displacement (speckle shearing interferometry) between the two adjacent points is measured in at least three phases of the continuous wave different from each other while exciting an elastic wave of a continuous wave to the inspection target object. This makes it possible to reproduce all vibration states of the elastic wave at any location within the inspection area regardless of the relationship between the size across the inspection area and the wavelength of the elastic wave, which in turn can detect a defect with high accuracy regardless of the position in the inspection area.

PRIOR ART DOCUMENT

Patent Document

Patent Document 1: Japanese Unexamined Patent Application Publication No. 2017-219318

SUMMARY OF THE INVENTION

Problems to be Solved by the Invention

In the defect detection method described in Patent Document 1, the interference light reflected by the surface of the inspection target object is observed from the outside. Therefore, in cases where any member covering the surface of the inspection target object (e.g., in a case where a bridge, a tunnel, etc., is an inspection target object, the reinforcing member installed on the bridge, the tunnel, etc.; hereinafter referred to as a shielding member) is provided on the inspection target object, the defect present at the portion covered by the shielding member cannot be detected.

Problems to be Solved by the Invention

It is an object of the present invention to provide a defect detection device capable of detecting not only a defect of an inspection target object present within a range observable from the outside but also a defect present outside the range observable from the outside.

Means for Solving the Problem

A defect detection device according to the present invention made to solve the above-described problems, includes:

an excitation source capable of being placed at any position on a surface of an inspection target object, the excitation source being configured to excite an elastic wave in the inspection target object, the elastic wave being predominant in one vibration mode and propagating in a predetermined direction;

an illumination unit configured to perform stroboscopic illumination on an illumination area of the surface of the inspection target object by using a laser light source;

a displacement measurement unit configured to collectively measure a displacement of each point in a front-back direction within the illumination area in at least three different phases of the elastic wave, by speckle interferometry or speckle shearing interferometry; and a reflected wave/scattered wave detector configured to detect either one or both of a reflected wave and a scattered wave of the elastic wave, based on the displacement measured by the displacement measurement unit.

In the defect detection device according to the present invention, an excitation source is positioned at a desired position of the inspection target object, and an elastic wave is excited from the excitation source to the inspection target object. The elastic wave is predominant in one vibration mode and propagates in a predetermined direction. In a case where there exists a defect in the direction along which the acoustic wave propagates within the inspection target object, a reflected wave or a scattered wave which is an elastic wave reflected or scattered by the defect is generated. Therefore, when either one or both of the position of the excitation source and the propagation direction of the elastic wave is moved, only in a case where there exists a defect in the propagation direction of the elastic wave, a reflected wave or a scattered wave at the defect is generated. Here, if elastic waves of a plurality of vibration modes are mixed or there exists an elastic wave component propagating in a direction other than a predetermined direction, it is difficult to detect the reflected wave and the scattered wave. Therefore, in the defect detection device according to the present invention, the position of the excitation source or/and the propagation direction of the elastic wave is moved, and stroboscopic illumination to the illumination area by the illumination unit is performed while exciting the elastic wave which is predominant in one vibration mode and propagates in a predetermined direction to thereby collectively measure the displacement of each point in the front-back direction (in the direction approaching the illumination unit or the direction away from the illumination unit) within the illumination area by using speckle interferometry or speckle shearing interferometry by the displacement measurement unit. At that time, the displacement measurement unit measures the displacement of each point in the front-back direction in at least three phases different from each other to reproduce the total vibration status of the elastic wave at each point of the illumination area. Here, the illumination area may be the entire surface of the inspection target object or a part thereof. In cases where a part of the surface of the inspection target object is shielded by a shielding member, the illumination area will, of course, be (all or a part of) a portion excluding the shielded area. Thus, the displacement of each point in the front-back direction within the illumination area is measured collectively, and the amplitude and the phase of the vibration of each point is obtained from the displacement. Then, in the reflected wave/scattered wave detector, an image is generated based on the value of the amplitude and the phase of the vibration at each point. By using an image processing technique to the generated image or visually observing the image by an examiner, the reflected wave and/or the scattered wave is detected. The position of the defect can be identified from the position of the excitation source position, the propagating direction of the elastic wave, and the propagation direction of the reflected wave and/or the scattered wave. In the illumination area, the elastic wave from the excitation source and the reflected wave reflected by the end of the inspection target object are also observed. However, when the position of the end portion, etc., is known, the reflected wave and/or the scattered wave caused by the defect can be distinguished from those waves.

According to the defect detection device of the present invention, even in cases where a defect is present outside the illumination area, the defect can be detected by measuring the reflected wave or the scattered wave that is reflected or scattered by the defect and propagates through the illumination area in the illumination area. As a result, a defect present outside a range capable of being observed from the outside in a portion with a shielding member can also be detected.

The displacement measurement unit measures the displacement in the front-back direction by the displacement using speckle interferometry or speckle shearing interferometry as described above. Of these, in the speckle shearing interferometry, two light for measuring a displacement at a certain point pass through almost the same optical path. Therefore, the speckle shearing interferometry has a feature that it is less susceptible to environmental disturbances due to differences in transit conditions as compared with the speckle interferometry in which the measurement light and the reference light pass through different paths. Further, although the minimum number of phases required to determine the waveform of the reflected wave and/or the scattered wave is 3, by increasing the number of phases to be measured more than 3, it is possible to further increase the accuracy of the resulting waveform.

The following two examples can be suitably used for the excitation source.

An excitation source of a first example includes:

a contact in which a plurality of contact portions to be brought into contact with the surface of the inspection target object is arranged at equal intervals; and a vibration applying unit configured to apply vibration to the inspection target object, the vibration having a same frequency as a frequency of the elastic wave when the elastic wave of a wavelength of a same length as the interval is generated in the inspection target object.

By bringing such a contact into contact with the surface of the inspection target object and applying vibration from the vibration applying unit to the contact, it is possible to generate an elastic wave that is oriented in a direction in which the contact portions are arranged and propagates along the surface of the inspection target object.

Further, since the interval of the contact portions matches the wavelength of the elastic wave generated in the inspection target object, the inspection target object can be strongly excited, and the amplitude of the elastic wave can be increased. By increasing the amplitude of the elastic wave in this way, the defect can be detected with high sensitivity.

In the excitation source of the first example, the gap between a plurality of contact portions arranged at equal intervals may be an air space. However, it is desirable that a second contact portion be provided between two adjacent contact portions of the plurality of contact portions and that the vibration applying unit be configured to apply vibration different in phase by 180° between the contact portion and the second contact portion. With this configuration, vibration can be applied to the surface of the inspection target object from both the contact portion and the second contact portion in accordance with the spatial phase of the elastic wave generated on the surface of the inspection target object, so that the intensity of the elastic wave can be increased.

An excitation source of a second example is used in cases where the inspection target object is a plate-like member. The excitation source includes:

a contact portion having a contact surface to be brought into contact with the surface of the inspection target object; and a vibration applying unit configured to apply vibration for exciting an elastic wave in the inspection target object to the contact portion, the elastic wave propagating in a direction inclined with respect to the contact surface and having a wavelength that coincides with a wavelength of a vibration mode that may occur in the inspection target object.

When the plate-shaped inspection target object is excited by using such an excitation source, an elastic wave propagating in a direction parallel to the plate surface of the plate-shaped inspection target object is generated. In addition, this vibration applying unit excites an elastic wave of a wavelength that coincides with a wavelength of a vibration mode that may occur in the inspection target object to increase the amplitude of the elastic wave even in the case of an elastic wave of a short wavelength. Thus, the defect can be detected with high sensitivity.

In the excitation source of the first example, it is preferable that the contact portion be made of a material with acoustic impedance, a difference between the acoustic impedance of the material and acoustic impedance of the inspection target object being smaller than a difference between acoustic impedance of the vibration applying unit and the acoustic impedance of the inspection target object.

Further, in cases where the excitation source of the first example includes the second contact portion, it is preferable that the second contact portion be made of a material with acoustic impedance, a difference between the acoustic impedance of the material and acoustic impedance of the inspection target object being smaller than a difference between acoustic impedance of the vibration applying unit and the acoustic impedance of the inspection target object. Also in the excitation source of the second example, in the same manner as in the excitation source of the first example, it is preferable that the contact portion be made of a material with acoustic impedance, a difference between the acoustic impedance of the material and acoustic impedance of the inspection target object being smaller than a difference between acoustic impedance of the vibration applying unit and the acoustic impedance of the inspection target object. With this configuration, it is possible to increase the efficiency of exciting the inspection target object, which in turn can increase the amplitude of the elastic wave.

When a plate-shaped inspection target object is excited by using the excitation source of the first or second example, an elastic wave called "Lamb wave" is generated. The Lamb wave is a wave in which a longitudinal wave and a transverse wave are mixed, and has vibration components in both the direction perpendicular to the propagation direction and the direction parallel to the propagation direction, and is characterized in that it has a speed-dispersive property in which the phase velocity changes depending on the frequency and it can take a plurality of vibration modes in which the relation between the frequency and the phase velocity differs from each other. Therefore, even in cases where the sound velocity determined by the material of the inspection target object is fast, the higher-frequency vibration mode can be selected without reducing the efficiency of exciting the inspection target object, and the wavelength of the elastic wave in the inspection target object can be shortened. Thus, by shortening the wavelength of the elastic wave in the inspection target object, it is possible to reflect or scatter the elastic wave even in the case of a small defect. Thus, it is possible to more reliably detect a defect.

Effects of the Invention

The defect detection device according to the present invention can detect not only a defect of the inspection target object present within the range observable from the outside but also a defect present outside the range observable from the outside.

EMBODIMENTS FOR CARRYING OUT THE INVENTION

Some embodiments of a defect detection device according to the present invention will be described with reference to FIG. 1 to FIG. 10.

Figure 1:
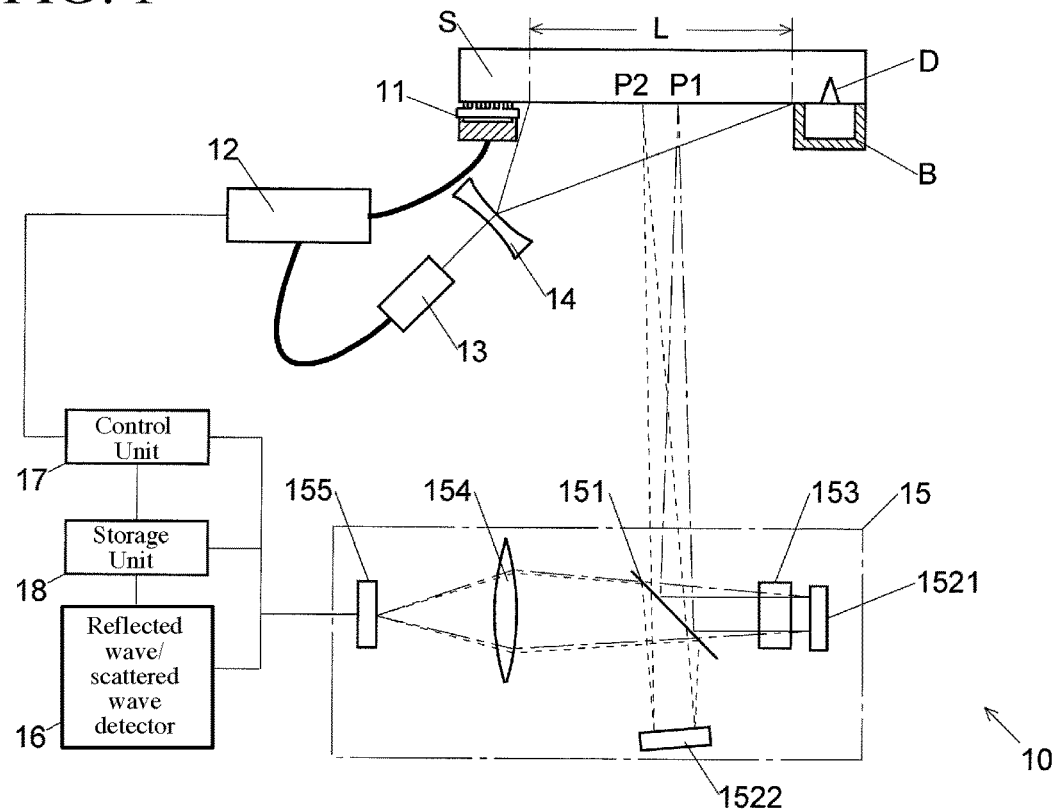
FIG. 1 is a schematic block diagram showing a first embodiment of the defect detection device according to the present invention.

(1) First Embodiment (1-1) Configuration of Defect Detection Device of First Embodiment FIG. 1 is a schematic block diagram of a defect detection device 10 according to a first embodiment. The defect detection device 10 is provided with an excitation source 11, a signal generator 12, a pulsed laser light source 13, an illumination light lens 14, a speckle shearing interferometer 15, a reflected wave/scattered wave detector 16, a control unit 17, and a storage unit 18.

Figure 2A:
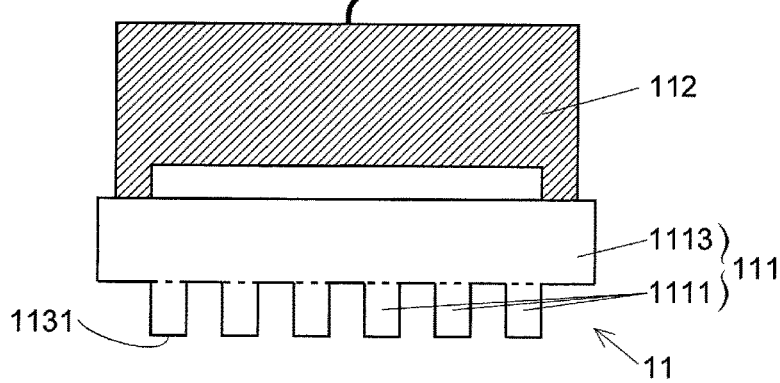
FIG. 2A is a longitudinal cross-sectional view showing an example of an excitation source used in the defect detection device of the first embodiment.

The excitation source 11 has a contact 111 and a vibration applying unit 112 as shown in FIG. 2A. The contact 111 has a contact portion 1111 and a base 1113. The contact portion 1111 is preferably made of the same material as that of an inspection target object, or a material having acoustic impedance closer to the acoustic impedance of the material of the inspection target object than the acoustic impedance of the material of the vibration applying unit 112. In this embodiment in which the inspection target object S is a steel plate, iron is used for the material of the contact portion 1111, and ceramics is used for the material of the vibration applying unit 112. The value of the acoustic impedance of the iron used for the contact 111 is closer to the value of the acoustic impedance of the steel of the inspection target object S than the value of the acoustic impedance of the ceramics of the vibration applying unit 112.

The contact portion 1111 has a rod-like shape of a rectangular or a square cross-section. A plurality of contact portions 1111 is arranged at equal intervals in a direction (the right-left direction in FIG. 2A) perpendicular to the longitudinal direction (the direction perpendicular to the plane of FIG. 2A). The base 1113 is a single rectangular parallelepiped-shaped member made of the same material as that of the contact portion 1111. One of the four faces (including one side of a rectangular or square cross-section) of the contact portion 1111 is a contact surface 1131 that is brought into contact with the surface of the inspection target object S, and a face opposite to the contact surface 1131 is in contact with one face of the base 1113. Practically, the contact portion 1111 and the base 1113 are integrally formed. In the contact 111 of this embodiment, the gap between the adjacent contact portions 1111 is a space (air). In this embodiment, the distance between adjacent contact portions 1111 is 8 mm. This interval is set to match the wavelength of the elastic wave of 360 kHz (described below) generated in the steel plate, which is an inspection target object.

Figure 2B:
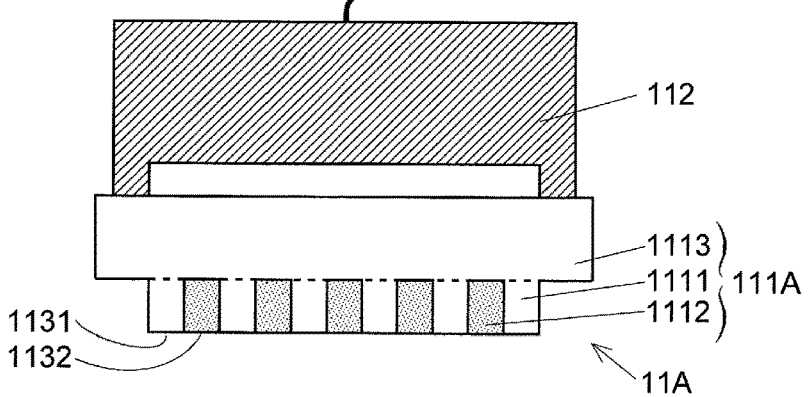
FIG. 2B is a longitudinal cross-sectional view showing a modification of the excitation source used in the defect detection device of the first embodiment.

Between the adjacent contact portions 1111, instead of the space (air) as described above, a second contact portion 1112 may be provided like the contact 111A in the excitation source 11A of the modification shown in FIG. 2B. The second contact portion 1112 is made of tin, which is a material different from the material of the contact portion 1111. The velocity at which the acoustic wave (vibration) propagates differs between iron (longitudinal wave velocity: 5,950 m/s) which is a material of the contact portion 1111 and tin (longitudinal wave velocity: 3,230 m/s) which is a material of the second contact portion 1112. Therefore, when the height of the contact portion 1111 and that of the second contact portion 1112 (the distance between the base 1113 and the contact surface 1131) are each set to 9.8 mm and the frequency is set to 360 kHz, sound waves different in phase by 180° (antiphase) arrive at the contact surface 1131 of the contact portion 1111 and the contact surface 1132 of the second contact portion 1112 at 180° different phase. Thus, between the contact surfaces 1131 of the adjacent contact portions 1111, antiphase vibration is applied from the contact surface 1132 of the second contact portion 1112. For this reason, it is possible to increase the intensity of the elastic wave generated in the inspection target object. This elastic wave is a Lamb wave of a vibration mode called A0 mode when the plate thickness of the steel plate, which is the inspection target object S, is 10 mm. This A0 mode corresponds to the predominant "one vibration mode" (described above).

The vibration applying unit 112 is composed of a piezoelectric element. It is in contact with the surface of the base 1113 of the contact 111 opposite to the surface contacting the contact portion 1111. The vibration applying unit 112 is connected to the signal generator 12 by a cable. The signal generator 12 is configured to generate an alternating electrical signal of a predetermined frequency and transmit the signal to the vibration applying unit 112 of the excitation source 11. In this embodiment, this frequency is set to 360 KHz as described above. This alternating electrical signal causes the vibration applying unit 112 to vibrate at the predetermined frequency to apply the vibration to the contact portion 1111. The contact surface 1131 (the contact surfaces 1131 and 1132 in the case of using the contact 111A) is brought into contact with the surface of the inspection target object S, and the vibration is propagated to the surface of the inspection target object S through the contact portion 1111.

The signal generator 12 is connected to the pulsed laser light source 13 with a cable different from the cable connecting to the vibration applying unit 112 to transmit a pulsed electric signal (pulse signal) to the pulsed laser light source 13 at a timing at which the alternating electrical signal becomes a predetermined phase. The predetermined phase and the timing determined thereby are changed during the defect inspection as described below. The pulsed laser light source 13 is a light source configured to output pulsed laser light upon receipt of a pulse signal from the signal generator 12. The illumination light lens 14 is disposed between the pulsed laser light source 13 and the surface of the inspection target object S and is configured by a concave lens. The illumination light lens 14 serves to expand the pulsed laser light from the pulsed laser light source 13 to the entire illumination area L on the surface of the inspection target object S. In this embodiment, the illumination area L is defined as an area of the surface of the inspection target object S except for a portion hidden by an obstacle (shielding member) B. The obstacle B is exemplified by the above-described reinforcing member. The pulsed laser light source 13 and the illumination light lens 14 correspond to the above-described illumination unit.

The speckle shearing interferometer 15 corresponds to the above-described displacement measurement unit. It includes a beam splitter 151, a first reflecting mirror 1521, a second reflecting mirror 1522, a phase shifter 153, a condenser lens 154, and an image sensor 155. The beam splitter 151 is a half mirror disposed at a position on which the illumination light reflected by the illumination area L on the surface of the inspection target object S is incident. The first reflecting mirror 1521 is arranged on the optical path of the illumination light reflected by the beam splitter 151. The second reflecting mirror 1522 is arranged on the optical path of the illumination light transmitted through the beam splitter 151. The phase shifter 153 is arranged between the beam splitter 151 and the first reflecting mirror 1521 to change (shift) the phase of the light passing through the phase shifter 153. The image sensor 155 is arranged on the optical path of the illumination light reflected by the first reflecting mirror 1521 after being reflected by the beam splitter 151 and transmitted through the beam splitter 151 and the illumination light reflected by the second reflecting mirror 1522 after being transmitted through the beam splitter 151 and reflected by the beam splitter 151. The condenser lens 154 is arranged between the beam splitter 151 and the image sensor 155.

The first reflecting mirror 1521 is arranged so that its reflection surface is at an angle of 45° with respect to the reflecting surface of the beam splitter 151. In contrast, the second reflecting mirror 1522 is arranged so that its reflection surface is at an angle slightly inclined from 45° with respect to the reflection surface of the beam splitter 151. With the arrangement of the first reflecting mirror 1521 and the second reflecting mirror 1522, at the image sensor 155, the illumination light reflected at a point P1 on the surface of the inspection target object S and the first reflecting mirror 1521 (see, the dash-dot line in FIG. 1) and the illumination light reflected at a point P2 slightly offset from the point P1 on the surface and the second reflecting mirror 1522 (see, the dashed line in FIG. 1) are incident on the same position of the image sensor 155 and interfere. The image sensor 155 has a number of detecting elements and detects the light incident on the image sensor 155 from a number of points (the above-described point P1) on the surface of the inspection target object S via the first reflecting mirror 1521 and the phase shifter 153. Similarly, for the above-described point P2, the image sensor 155 detects the light incident on the image sensor from a number of points via the second reflecting mirror 1522 by different detecting elements.

The reflected wave/scattered wave detector 16 determines the vibration state (the amplitude and the phase) of the elastic wave at each point of the illumination area L based on the light detected by the image sensor 155 and detects the reflected wave and/or scattered wave at the defect D based on the vibration state as described later.

The control unit 17 is configured to control the signal generator 12 and performs data processing based on the detection signal obtained from each detecting element of the image sensor 155. The storage unit 18 is configured to store the detection signal obtained from each detecting element of the image sensor 155 and the data processed by the control unit 17.

(1-2) Operation of Defect Detection Device of First Embodiment

Figure 3:
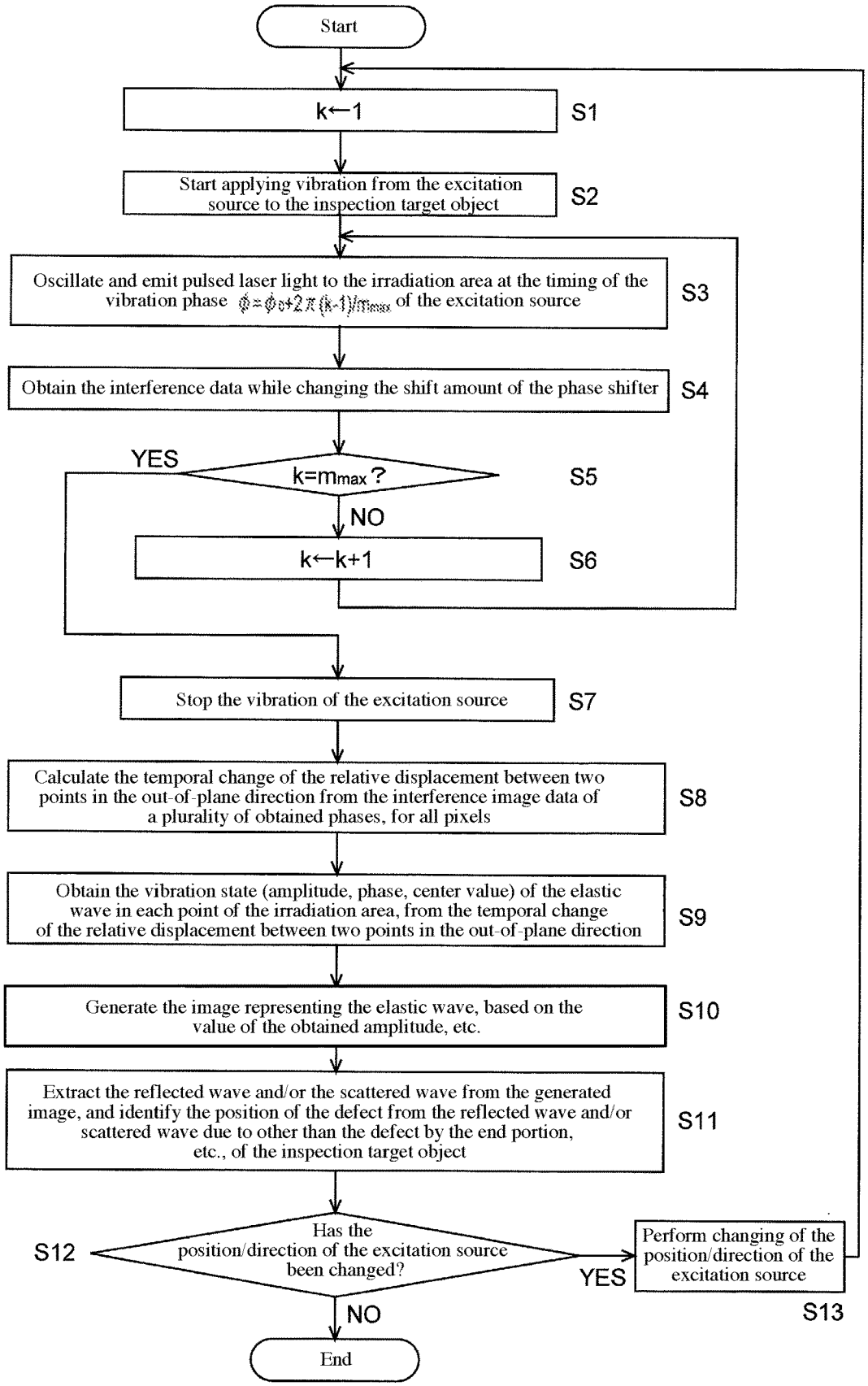
FIG. 3 is a flowchart showing the operation of the defect detection device of the first embodiment.
Figure 4A:
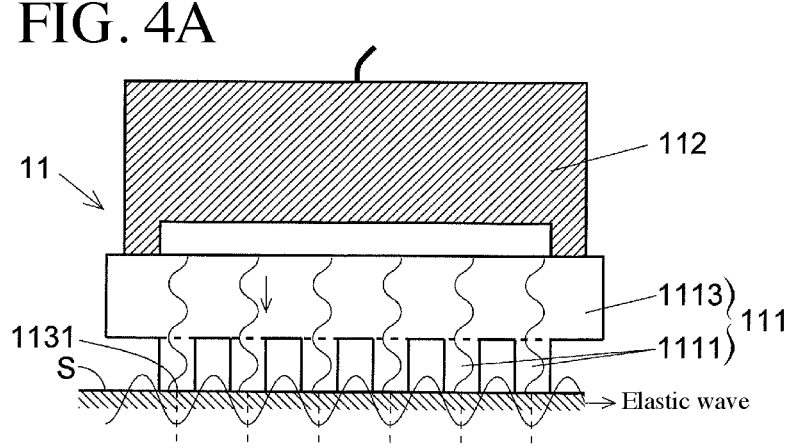
FIG. 4A is a schematic diagram showing the operation of an example of the excitation source used in the defect detection device of the first embodiment.
Figure 4B:
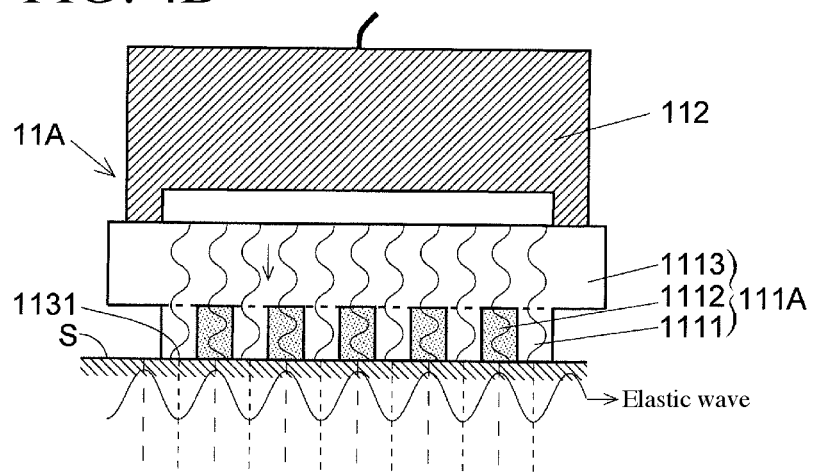
FIG. 4B is a schematic diagram showing the operation of a modification of the excitation source used in a defect detection device of the first embodiment.
Figure 5:
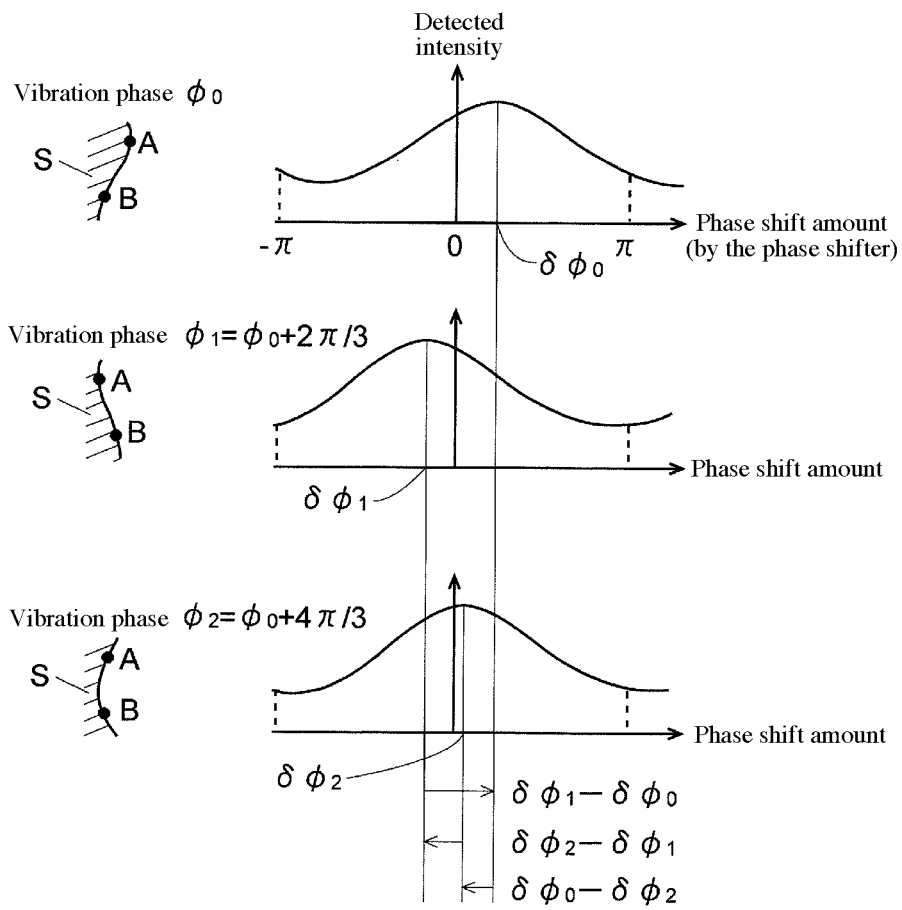
FIG. 5 is a graph for explaining a principle of a defect inspection performed in the defect detection device of the first embodiment.
Figure 6:
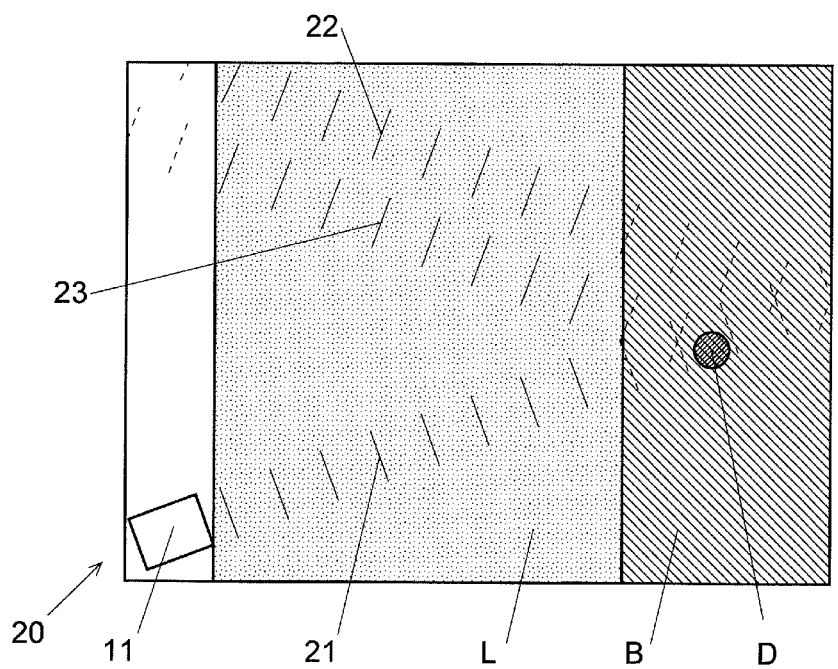
FIG. 6 is a schematic diagram showing an example of an elastic wave observed in an illumination area.

Hereinafter, the operation of the defect detection device 10 will be described with reference to FIG. 3 to FIG. 6. FIG. 3 is a flowchart showing the operation of the defect detection device 10. FIG. 4A and FIG. 4B are schematic diagrams showing the operation of the excitation sources 11 and 11A. FIG. 5 is a graph for explaining the principle of the defect inspection performed by the defect detection device 10. FIG. 6 is a schematic diagram showing an example of an elastic wave observed in the illumination area L.

In this embodiment, surface displacement measurements different in the phase of the vibration of the excitation source 11 are performed $m_{max} \geq 3$ times. Here, the "phase of the vibration of the excitation source 11" denotes a phase of the signal of the alternating electrical signal transmitted from the signal generator 12 to the excitation source 11 and corresponds to the phase of the elastic wave at a certain point on the surface of the inspection target object S. At each point on the surface of the inspection target object S other than the above-described one point, the vibration has a phase which deviates from the phase of the above-described one point by a predetermined amount regardless of the time. In the following description, each measurement of the surface displacement is referred to as "$k^{th}$ measurement" using the numerical value k (k is any natural number between 1 and $m_{max}$). Further, in the following description, all Steps in the case of $m_{max}=3$ will be described as the simplest example, and then the description will be directed to the case in which $m_{max}$ is a larger number.

First, the initial value of k is set to 1 (Step S1), and the application of vibration from the contact 111 of the excitation source 11 to the inspection target object S is initiated by transmitting an alternating electrical signal from the signal generator 12 to the excitation source 11 (Step S2).

Here, the application of the vibration to the inspection target object S is performed as follows. First, the piezoelectric element constituting the vibration applying unit 112 of the excitation source 11 vibrates upon receipt of an alternating electrical signal. The vibration of the vibration applying unit 112 is transmitted to the inspection target object S via each of the plurality of contact portions 1111 in the same phase. In the excitation source 11, the plurality of contact portions 1111 is arranged at equal intervals in accordance with the wavelength of the elastic wave generated in the inspection target object S as described above. Therefore, in the inspection target object S, an elastic wave that has the above-described wavelength and is oriented in the arrangement direction of the plurality of contact portions 1111 is generated (see FIG. 4A). Note that in FIG. 4A, the wave of the vibration of the contact 1111 and the elastic wave generated in the inspection target object S are illustrated like transverse waves, but actually, those waves are longitudinal waves.

In cases where the excitation source 11A is used, as shown in FIG. 4B, the vibration that propagates from the vibration applying unit 112 to the surface of inspection target object S via the contact portion 1111 and the vibration from the vibration applying unit 112 to the surface of inspection target object S via the second contact portion 1112 differ in phase by 180°. With this, as compared with the excitation source 11, although the wavelength of the elastic wave generated in the inspection target object S is the same, as the vibration is transmitted from both the contact portion 1111 and the second contact portion 1112, the intensity of the elastic wave is increased.

In a state in which the elastic wave is generated in the inspection target object S as described above, the signal generator 12 transmits the pulse signal to the pulsed laser light source 13 for each timing at which the phase of the vibration of the excitation source 11 is represented by $[\varphi_0 + 2\pi(k-1)/m_{max}]$ using a predetermined initial value $\varphi_0$ (e.g., $\varphi_0 = 0$). Since k is 1 (k=1) at this stage, the phase of the vibration of the excitation source 11 when the pulse signal is transmitted is $\varphi_0$. The pulsed laser light source 13 repeatedly outputs illumination light which is pulsed laser light every time it receives a pulse signal. This illumination light is expanded by the illumination light lens 14 and emitted to the entirety of the illumination area L on the inspection target object S (Step S3).

The illumination light is reflected by the surface of the inspection target object S in the illumination area L and is incident on the beam splitter 151 of the speckle shearing interferometer 15. A part of the illumination light is reflected by the beam splitter 151 and reflected by the first reflecting mirror 1521 after passing through the phase shifter 153 again. A part of the illumination light after passing through the beam splitter 151 is incident on the image sensor 155. The remainder of the illumination light incident on the beam splitter 151 is transmitted through the beam splitter 151, reflected by the second reflecting mirror 1522, partially reflected by the beam splitter 151, and incident on the image sensor 155. The image sensor 155 detects the illumination light reflected at a number of points on the surface of the inspection target object S by different detecting elements.

The phase shifter 153 changes (shifts) the phase of the illumination light (i.e., the illumination light reflected at the point P1) passing through the phase shifter 153 while the illumination light, which is pulsed laser light, is repeatedly output. This changes the phase difference between the illumination light reflected at the point P1 and the illumination light reflected at the point P2. During this change, each detecting element of the image sensor 155 detects the intensity of the interference light in which the two illumination light is interfered (Step S4). The upper diagram of FIG. 5 graphically shows an example of the shift amount of the phase by the phase shifter 153 and the intensity of the interference light detected by the detecting element of the image sensor 155, obtained when the phase of the vibration of the excitation source 11 is $\varphi_0$. Note that in FIG. 5, the relation in which the detection intensity changes sinusoidally with respect to the phase shift amount is shown by a continuous curve. However, actually observed is discrete data. The above-described continuous sine waveform is reproduced by a least-squares method or the like from the observed data. For this purpose, it is necessary to detect the intensities in at least three different phase shift amounts.

Next, in Step S5, it is confirmed whether or not the value of k has reached $m_{max}$. At this stage, since k=1 and $m_{max}$ (3 in this example) has not yet been reached, the determination in Step S5 is "NO". If "NO", the process proceeds to Step S6, and the value of k is incremented by 1 to set to "2" (the case where the determination in Step S5 is "YES" will be described later).

Next, returning to Step S3, for each timing at which the phase of the vibration of the excitation source 11 is k=2 in $[\varphi_0+2\pi(k-1)/m_{max}]$, i.e., $[\varphi_0+2\pi/3]\equiv\varphi1$, the signal generator 12 transmits a pulse signal to the pulsed laser light source 13, and the pulsed laser light source 13 repeatedly irradiates the surface of the inspection target object S with the illumination light, which is pulsed laser light, on the surface of the inspection target object S at the timing at which it receives the pulse signal. While changing (shifting) the phase of the illumination light reflected at the point P1 by the phase shifter 153 to at least three values, each detecting element of the image sensor 155 detects the intensity of the interference light of the illumination light reflected by the point P1 and passed through the phase shifter 153 and the like and the illumination light reflected at the point P2 (Step S4).

The middle diagram of FIG. 5 graphically shows the shift amount by the phase shifter 153 and the intensity of the interference light detected by the detecting element of the image sensor 155, which are obtained when the phase of the vibration of the excitation source 11 is $\varphi1$. Comparing the middle diagram of FIG. 5 with the upper diagram of FIG. 5, the peak positions of the intensity of the interference light are shifted by $\delta\varphi_1-\delta\varphi_0$ in both cases. This shift indicates that the phase difference between the light from the point P1 and the light from the point P2 has changed due to the difference in the phase of the vibration of the excitation source 11 at the time of the detection. This change in the phase difference of the optical path indicates that the relative displacement of the point P1 and the point P2 in the out-of-plane direction is changing.

After performing the operation of Step S4 at k=2 as described above, it is determined to be "NO" in Step S5 because $m_{max}$ (=3) has not yet been reached, and increments the value of k by 1 to "3" in Step S6. Then, the process returns to Step S3, the image sensor 155 repeatedly emits illumination light, which is pulsed laser light, to the surface of the inspection target object S every timing at which the phase of the alternating electrical signal is k=3 in $[\varphi_0+2\pi(k-1)/m_{max}]$, i.e., $[\varphi_0+4\pi/3]\equiv\varphi2$. Each detecting element of the image sensor 155 detects the intensity of the interference light (Step S4), where pulsed laser light source 13. Thus, as shown in the lower diagram of FIG. 5, the relationship between the shift amount of the phase by the phase shifter 153 and the intensity of the interference light when the phase of the alternating electrical signal is $\varphi_2$ is obtained.

Thereafter, in Step S5, since the value of k is 3 and the value has reached $m_{max}$, it is determined to be "YES", and the process proceeds to Step S7. In Step S7, the transmission of the alternating electrical signal from the signal generator 12 to the excitation source 11 is stopped to thereby stop the vibration of the excitation source 11.

Next, in Step S8 and Step S9, the reflected wave/scattered wave detector 16 obtains the vibration state (the amplitude and the phase) of the elastic wave at each point in the illumination area L by the following operations. First, the reflected wave/scattered wave detector 16 obtains the maximum output phase shift amount $\delta\varphi_0$, $\delta\varphi_1$, $\delta\varphi_2$ that maximizes the output of the detecting element when the shift amount of the phase by the phase shifter 153 is changed at the phase $\varphi_0$, $\varphi_1$, and $\varphi_2$ of each vibration, for each detecting element of the image sensor (see each graph of FIG. 5). Further, the reflected wave/scattered wave detector 16 obtains the differences $(\delta\varphi_1-\delta\varphi_0)$, $(\delta\varphi_2-\delta\varphi_1)$ and $(\delta\varphi_0-\delta\varphi_2)$ of the maximal output phase shift amount at which the phase of vibration differs (Step S8). These three differences in the maximum output phase shift amount indicate the three sets of relative displacements of the point P1 and point P2 in the out-of-plane direction by two data which differs in the phase of the vibration of the excitation source 11 (i.e., differs in time). Based on these three sets of relative displacements, the reflected wave/scattered wave detector 16 determines the values of the three parameters, i.e., the amplitude of the vibration, the phase of the vibration, and the center value of the vibration (DC component) at each point in the illumination area L (Step S9).

The reflected wave/scattered wave detector 16 obtains the value of the displacement of each point in the front-back direction at a certain time from the amplitude, the phase, and the center value of the vibration of each point obtained as described above, and generates an image representing an elastic wave formed in the illumination area L based on the value of the displacement (Step S10). For example, an elastic wave can be expressed by changing the luminance of the pixel corresponding to the point depending on the value of the displacement of each point.

In Step S11, the reflected wave/scattered wave detector 16 detects the defect D as follows by analyzing the image 20 thus generated. In the image 20, for example, an elastic wave shown in FIG. 6 appears. First, an elastic wave excited from the excitation source 11 (oscillation wave 21) appears in the image 20 as a wave oriented in a direction along which the plurality of contact portions 1111 of the excitation source 11 is arranged. Further, a reflected wave (end portion reflected wave 22) in which the oscillation wave 21 is reflected at the end portion of the inspection target object S also appears in the image 20. The oscillation wave 21 and the end portion reflected wave 22 appear regardless of the presence or absence of a defect D in the inspection target object S. Note that in FIG. 6, the oscillation wave 21 is generated so as to be oriented in a direction non-perpendicular to the surface of the end portion of the inspection target object S so that the oscillation wave 21 and the end portion reflected wave 22 do not overlap.

In cases where a defect D is present in the direction along which the oscillation wave 21 is oriented from the excitation source 11, a reflected wave and/or a scattered wave (defect reflected/scattered wave 23) appears in the image 20. In a case where the defect D is hidden by an obstacle B and therefore is outside the illumination area L, the defect D cannot be directly observed. However, the defect reflected/scattered wave 23 reflected or scattered by the defect D reaches the illumination area L, and therefore it is possible to determine that the defect D is present on the extension of the oscillation wave 21 and the defect reflected/scattered wave 23.

On the other hand, in a case where no defect reflected/scattered wave 23 appears, it is determined that no defect D is present in the direction along which the oscillation wave 21 is oriented from the excitation source 11. However, whether or not a defect D is present at any other position cannot be determined by only one operation so far. Further, even in a case where a defect D is detected by a single operation, still other defects may be present in the inspection target object S. In these cases, there is a possibility that a defect is detected by changing the position and/or the orientation of the excitation source 11 (the oscillation direction of the oscillation wave 21). In Step S12, it is determined whether or not the position and/or the orientation of the excitation source 11 is changed. This determination may be performed such that the operator operates an input device, such as, e.g., a keyboard, a mouse, and a touch panel, each time. Alternatively, the determination may be performed such that the number of times of changing the position and/or the direction of the excitation source 11 or the magnitude of the change (the moving distance or the changing angle of the excitation source 11) is stored in a program in advance and the determination is executed according to the program. In a case where "YES" (change) is selected in Step S12, the position and/or the orientation of the excitation source 11 is automatically or manually changed in Step S13, and the process returns to Step S1 to perform the operations up to Step S11. On the other hand, when NO (not change) is selected in Step S12, the series of operations end.

According to the defect detection device 10 of the first embodiment, it is possible to detect a defect D present not only in the illumination area L but also outside the illumination area L of a portion covered by an obstacle (shielding member) B, by exciting an elastic wave with directivity on the surface of the inspection target object S using the excitation source 11 and observing the defect reflected/scattered wave 23 in which the elastic wave is reflected and/or scattered by the defect D by using a speckle shearing interferometer 15.

Further, according to the defect detection device 10 of the first embodiment, since the excitation source 11 can generate an elastic wave with a large amplitude of a wavelength matched to the interval of the contact portions 1111, it is possible to detect a defect with high sensitivity. Furthermore, by shortening the interval of the contact portions 1111, it is possible to prevent the amplitude of the elastic wave from becoming smaller even if the wavelength of the elastic wave is shortened. Thus, it is possible to more assuredly detect a smaller defect.

The acoustic impedance of the materials of the contact portion 1111 and the second contact portion 1112 is closer to the acoustic impedance of the material of the inspection target object S than the acoustic impedance of the material of the vibration applying unit 112. This also contributes to increase the amplitude of the elastic wave 11 by efficiently propagating vibration from the excitation source 11 to the inspection target object S.

(2) Configuration and Operation of Defect Detection Device of Second Embodiment

Figure 7A:
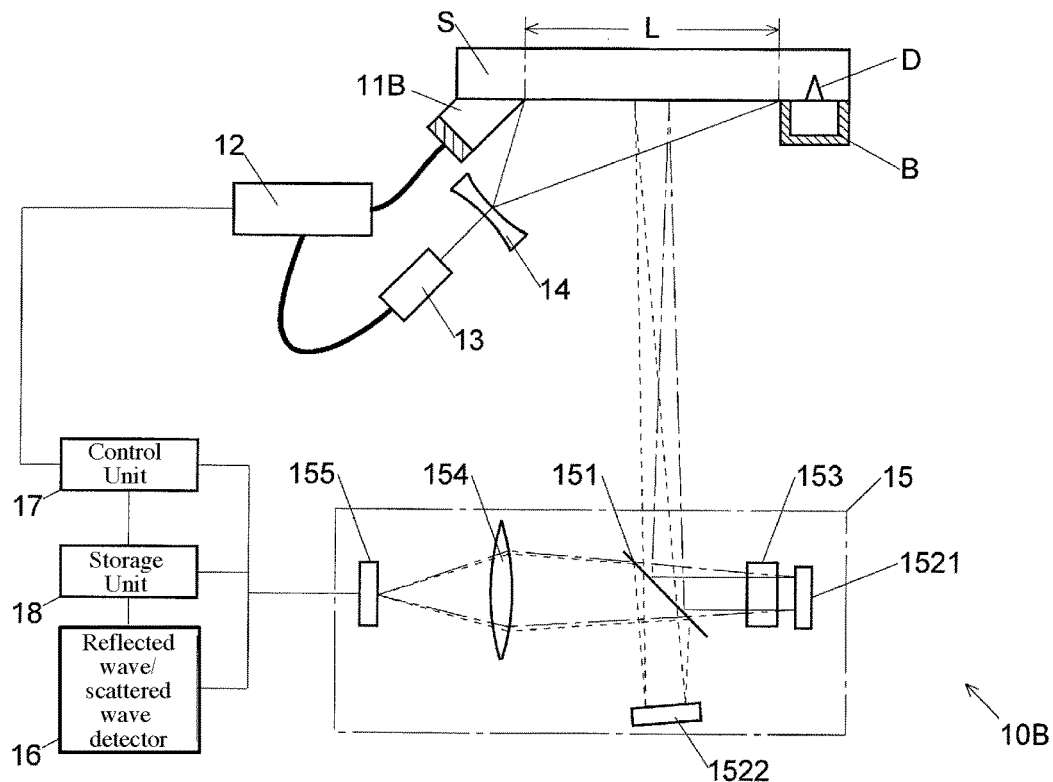
FIG. 7A is a schematic configuration diagram showing a second embodiment of the defect detection device according to the present invention.

FIG. 7A is a schematic configuration diagram of a defect detection device 10B of a second embodiment. This defect detection device 10B has the same configuration as the defect detection device 10 of the first embodiment except that the excitation source 11B is different from the excitation source 11, 11A.

Figure 7B:
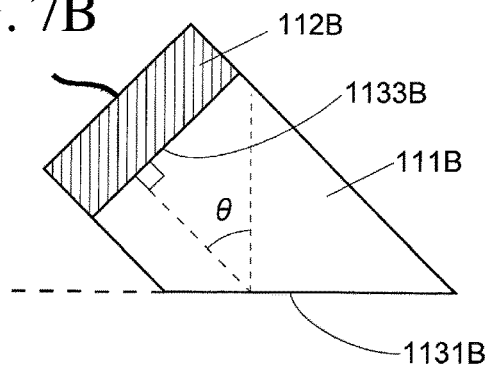
FIG. 7B is a longitudinal cross-sectional view showing an example of an excitation source used in the defect detection device of the second embodiment.

As shown in FIG. 7B, the excitation source 11B has a contact (contact portion) 111B and a vibration applying unit 112B. The contact 111B has a contact surface 1131B which is brought into contact with the surface of the inspection target object S and a receiving surface 1133B contacting the vibration applying unit 112B and receiving vibration of the vibration applying unit 112B. The contact surface 1131B and the receiving surface 1133B are non-parallel. Hereinafter, the angle formed by the normal line of the receiving surface 1133B and the normal line of the contact surface 1131B is defined as an angle θ. The vibration applying unit 112B is composed of a piezoelectric element and is connected to the signal generator 12 with a cable.

Figure 8:
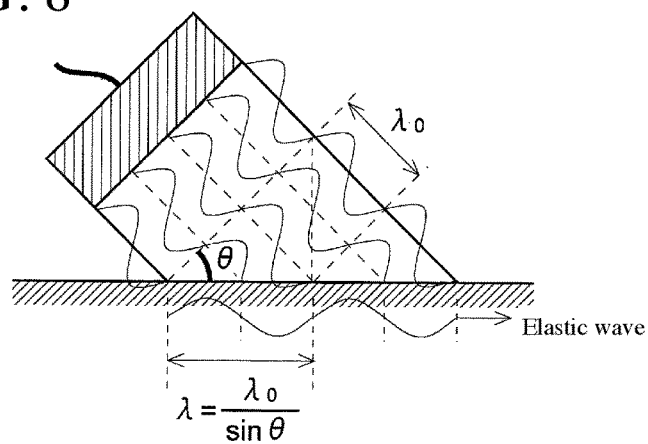
FIG. 8 is a schematic diagram showing an operation of the excitation source used in the defect detection device of the second embodiment.

With reference to FIG. 8, the operation of the excitation source 11B will be described. This excitation source 11B is configured to excite an elastic wave that propagates in one direction parallel to the plate surface to the plate-shaped inspection target object S. The contact surface 1131B of the excitation source 11B is brought into contact with the surface of the inspection target object S. In this state, an alternating electrical signal is transmitted from the signal generator 12 to the vibration applying unit 112B. As a result, the vibration applying unit 112B gives vibration to the receiving surface 1133B of the contact 111B in the normal direction of the receiving surface 1133B. This vibration propagates in the contact 111B in the normal direction of receiving surface 1133B (in the direction inclined with respect to the contact surface 1131B) and enters the contact surface 1131B at an incident angle θ. The wavelength of the vibration in the contact 111B at this time is defined as $\lambda_0$. In the receiving surface 1133B, it vibrates in the same phase at the same time, whereas in the contact surface 1131B, it vibrates in different phases depending on the position at the same time because the contact surface 1131B and the receiving surface 1133B are non-parallel. This difference in phase excites an elastic wave of a wavelength $\lambda=\lambda_0/(\sin\theta)$ on the surface of the inspection target object S. The condition that the wavelength of an elastic wave excited in the inspection target object by the contact 111B and the wavelength of a vibration mode capable of being generated in the inspection target object is called a phase matching condition. When this phase matching condition is satisfied, an elastic wave oriented in one direction parallel to the surface of the inspection target object is generated. As the material of the contact 111B, in order to efficiently excite vibration to the inspection target object while satisfying the phase matching condition, a soft metal high in the acoustic impedance and relatively low in the acoustic speed is suitably used. As such materials, copper, silver, gold, tin, zinc, or alloys containing them as a main component can be exemplified.

A specific example of the excitation source 11 B will be described. In this excitation source 11B, copper (longitudinal wave velocity v: 4,700 m/s) is used for the material of the contact 111B. θ=40°, and the frequency of the alternating electrical signal is 780 kHz. With this, the wavelength $\lambda_0$ in the contact 111B becomes (4,700 [m/s]/780 [kHz]) approximately 6 mm, and the wavelength λ of the elastic wave in the inspection target object S becomes a Lamb wave of 6 mm/(sin 40°)≈approximately 9 mm. The Lamb wave of such a wavelength is excited at the vibration mode called A3 mode in the inspection target object S which is a steel plate of a 10 mm thickness. This A3 mode corresponds to the "one vibration mode (described above)" predominant in the vibration in which the frequency is 780 kHz.

Figure 9:
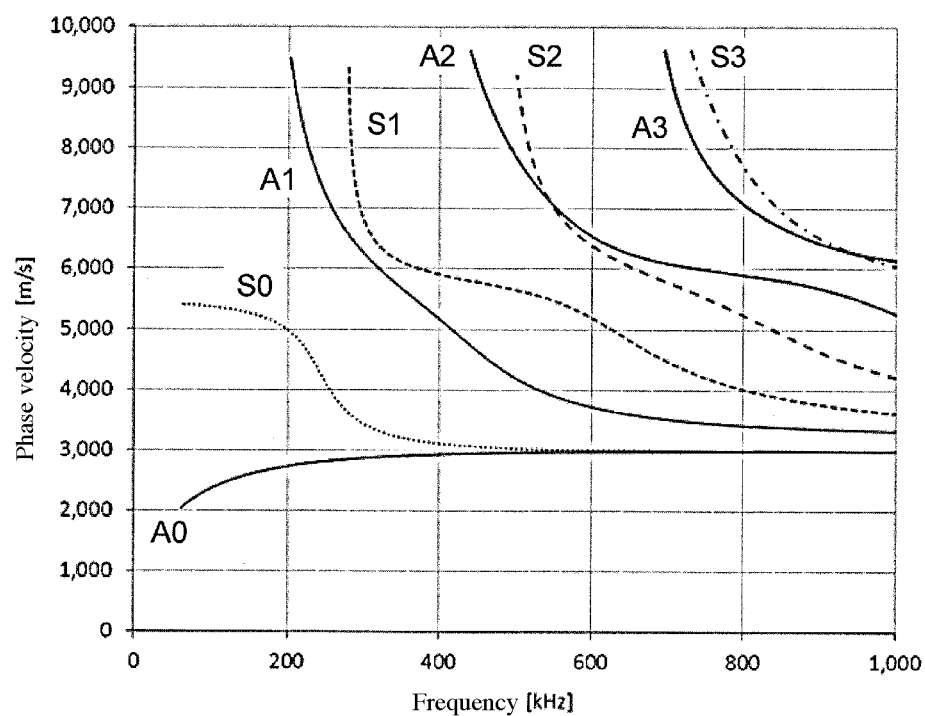
FIG. 9 is a dispersion curve showing the relation between the frequency and the phase velocity of the Lamb wave produced on a steel plate with a thickness of 10 mm.
Figure 10:
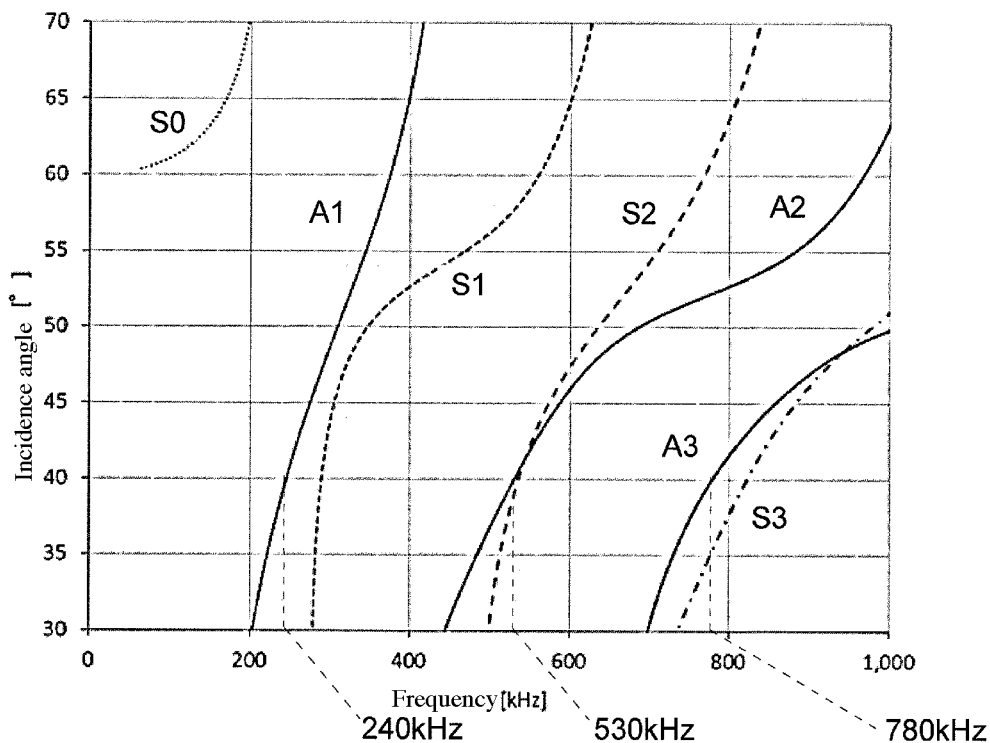
FIG. 10 is a graph showing the relationship between the frequency of vibration and the incident angle when a contact made of copper is used in the second embodiment.

Since the Lamb wave has a plurality of vibration modes as described above, by using the same excitation source 11B, it is possible to excite an elastic wave in the inspection target object S at a plurality of different frequencies. As one example, FIG. 9 shows a graphical representation of a dispersion curve that shows the relation between the frequency of the Lamb wave generated on a steel plate with a plate thickness of 10 mm and the phase velocity (the velocity at which a certain point (e.g., a crest, a trough) in the elastic wave move). This graph shows the dispersion relation of eight vibration modes, i.e., A0 to A3 and S0 to S3. For each of these dispersion modes, based on the dispersion curve, a graph representing the relationship between the incident angle θ and the frequency obtained to satisfy the phase matching condition is shown in FIG. 10. From FIG. 10, when θ=40°, it can be seen that, in addition to the Lamb wave of an A3 mode with the above-described frequency of about 780 kHz, a Lamb wave of an A1 mode with the frequency of about 240 kHz and a Lamb wave of an A2 mode with the frequency of 530 kHz are excited. Further, by using the excitation source 11B having a shape different in the incident angle θ, it is possible to excite a Lamb wave having a frequency other than the above.

The entire operation of the defect detection device 10B according to the second embodiment is similar to the operation of the defect detection device 10 according to the first embodiment, except for the operation of generating the elastic wave by the excitation source 11B described above. Therefore, by observing the defect reflected/scattered wave 23 in which the elastic wave having a directivity generated by the excitation source 11B is reflected and scattered by the defect D, it is possible to detect not only the defect D present in the illumination area L but also the defect D present outside the illumination area L at a position covered with an obstacle (shielding member) B, etc. Further, by exciting an elastic wave satisfying the phase matching condition, it is possible to increase the amplitude even if it is short in the wavelength. Thus, it is possible to detect a defect with high sensitivity.

Although embodiments using a speckle shearing interferometer 15 have been described above, the same measurement can be performed using the excitation source 11, 11A, 11B according to the above-described embodiments also when a speckle interferometer is used.

It should be noted that the present invention is not limited to the above-described embodiments, and various modifications can be made within the scope of the gist of the present invention.

DESCRIPTION OF SYMBOLS 10, 10B: Defect detection device
11, 11A, 11B: Excitation source
111, 111A, 111B: Contact
1111: Contact portion
1112: Second contact portion
1113: Base
112, 112B: Vibration applying unit
1131, 1131B, 1132: Contact surface
1133B: Receiving surface
12: Signal generator
13: Pulsed laser light source
14: Illumination light lens
15: Speckle shearing interferometer
151: Beam splitter
1521: First reflecting mirror
1522: Second reflecting mirror
153: Phase shifter
154: Condenser lens
155: Image sensor
16: Reflected wave/scattered wave detector
17: Control unit
18: Storage unit
20: Image
21: Oscillation wave
22: End portion reflected wave
23: Defect Reflecting and scattered wave
B: Obstacle
D: Defect
L: Illumination area
S: Inspection target object

The invention claimed is:

1. A defect detection device comprising:
an excitation source capable of being placed at any position on a surface of an inspection target object, the excitation source being configured to excite an elastic wave in the inspection target object, the elastic wave being predominant in one vibration mode, having a directivity, and propagating in a predetermined direction;
an illumination unit configured to perform stroboscopic illumination on an illumination area of the surface of the inspection target object by using a laser light source;
a displacement measurement unit configured to collectively measure a displacement of each point in a front-back direction within the illumination area in at least three different phases of the elastic wave, by speckle interferometry or speckle shearing interferometry; and
a reflected wave/scattered wave detector configured to detect either one or both of a reflected wave and a scattered wave of the elastic wave to determine the presence of a defect of the inspection target object, based on the displacement measured by the displacement measurement unit.

2. The defect detection device as recited in claim 1,
wherein the excitation source comprises:
a contact in which a plurality of contact portions to be brought into contact with the surface of the inspection target object is arranged at equal intervals; and
a vibration applying unit configured to apply vibration to the inspection target object, the vibration having a same frequency as a frequency of the elastic wave when the elastic wave of a wavelength of a same length as the interval is generated in the inspection target object.

3. The defect detection device as recited in claim 2,
wherein the contact portions are made of a material with acoustic impedance, a difference between the acoustic impedance of the material and acoustic impedance of the inspection target object being smaller than a difference between acoustic impedance of the vibration applying unit and the acoustic impedance of the inspection target object.

4. The defect detection device as recited in claim 2, further comprising:
a second contact portion provided between two adjacent contact portions of the plurality of contact portions,
wherein the vibration applying unit is configured to apply vibration different in phase by 180° between the contact portions and the second contact portion.

5. The defect detection device as recited in claim 1,
wherein the excitation source comprises:
a contact portion having a contact surface to be brought into contact with the surface of the inspection target object; and
a vibration applying unit configured to apply vibration for exciting an elastic wave in the inspection target object to the contact portion, the elastic wave propagating in a direction inclined with respect to the contact surface and having a wavelength that coincides with a wavelength of a vibration mode that may occur in the inspection target object.

6. The defect detection device as recited in claim 5, wherein the contact portion is made of a material with acoustic impedance, a difference between the acoustic impedance of the material and acoustic impedance of the inspection target object being smaller than a difference between acoustic impedance of the vibration applying unit and the acoustic impedance of the inspection target object.

* * * * *

UNITED STATES PATENT AND TRADEMARK OFFICE
CERTIFICATE OF CORRECTION

Page 1 of 1

PATENT NO. : 11,391,700 B2
APPLICATION NO. : 17/255975
DATED : July 19, 2022
INVENTOR(S) : Takahide Hatahori, Yuya Nagata and Kenji Takubo It is certified that error appears in the above-identified patent and that said Letters Patent is hereby corrected as shown below:

On the Title Page

Item (73) In the Assignee, replace "SAMSUNG ELECTRONICS CO., LTD., Suwon-si (KR)" with --SHIMADZU CORPORATION, Kyoto (JP)--.

Signed and Sealed this
First Day of November, 2022

Katherine Kelly Vidal
*Director of the United States Patent and Trademark Office*